E. G. GEHRLICH.
DEMOUNTABLE RIM.
APPLICATION FILED FEB. 17, 1920.
1,431,885.  Patented Oct. 10, 1922.
2 SHEETS—SHEET 1.
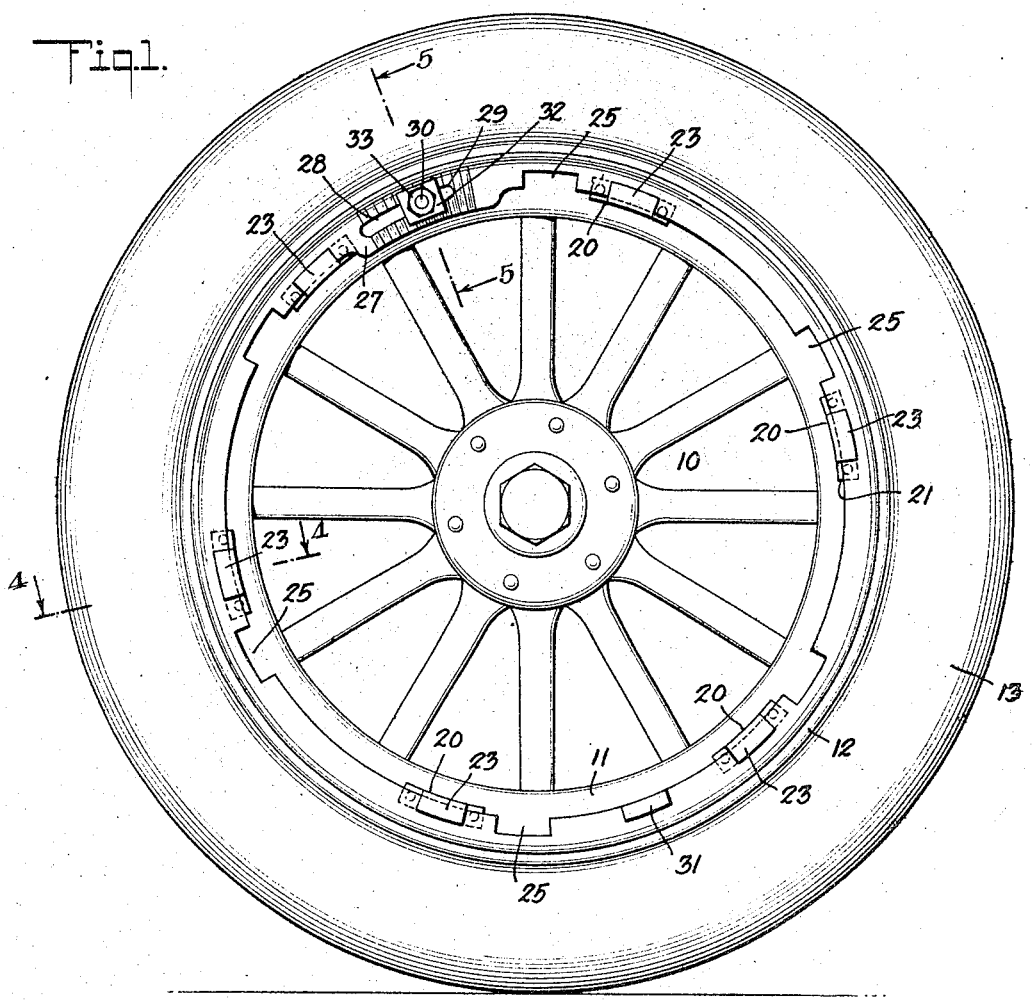
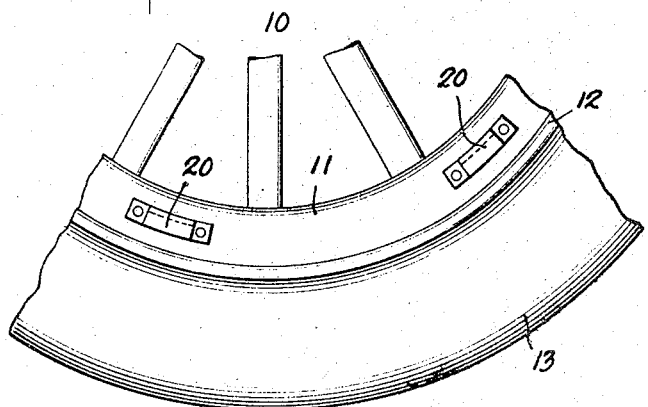
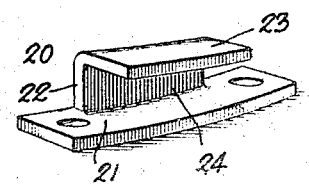
WITNESSES
Frederick Diehl.
Hugh H. Ott
INVENTOR
EARL G. GEHRLICH
BY Munn & Co
ATTORNEYS

E. G. GEHRLICH.
DEMOUNTABLE RIM.
APPLICATION FILED FEB. 17, 1920.

1,431,885.

Patented Oct. 10, 1922.
2 SHEETS—SHEET 2.

WITNESSES
Frederick Diehl.

INVENTOR
EARL G. GEHRLICH

ATTORNEYS

Patented Oct. 10, 1922.

1,431,885

UNITED STATES PATENT OFFICE.

EARL G. GEHRLICH, OF FOUNTAIN CITY, WISCONSIN.

DEMOUNTABLE RIM.

Application filed February 17, 1920. Serial No. 359,290.

*To all whom it may concern:*

Be it known that I, EARL G. GEHRLICH, a citizen of the United States, and resident of Fountain City, in the county of Buffalo and State of Wisconsin, have invented a new and Improved Demountable Rim, of which the following is a full, clear, and exact description.

This invention relates to demountable rims and has particular reference to a means for retaining a demountable rim upon the felly of a vehicle wheel.

In the usual construction of demountable rims and means for retaining the same on the felly of a wheel, use is made of a plurality of bolts for securing the rim in place upon the felly. This arrangement is not only a great source of trouble in that the nuts become rusted to the bolts, but requires a great amount of time in the demounting of the rim.

One of the principal objects of the present invention is to provide a simple, effective and convenient means for securing the rim to the felly which requires only the removal of a single locking nut to permit of the demounting of the rim.

Another object of the invention is to provide a means for demountably securing a rim to a felly which is in the nature of a complete device adapted to be used in connection with standard rims and fellies now in general use without materially altering the same.

A further object of the invention is to provide a circumferentially adjustable means which serves to co-act with means provided on the felly to position and secure the rim with relation thereto.

With these and other objects in view which will be more readily apparent hereafter, reference is had to the following description, claims and accompanying drawings forming a part of this application and in which, Figure 1 is a side elevation of a vehicle wheel and tire illustrating the means for demountably securing the tire rim to the felly.

Figure 2 is a fragmentary side elevation of the same with the locking ring removed and illustrating the retaining members which are adapted to be secured to the felly.

Figure 3 is a detail perspective view of one of the retaining members detached from the felly.

Figure 4:
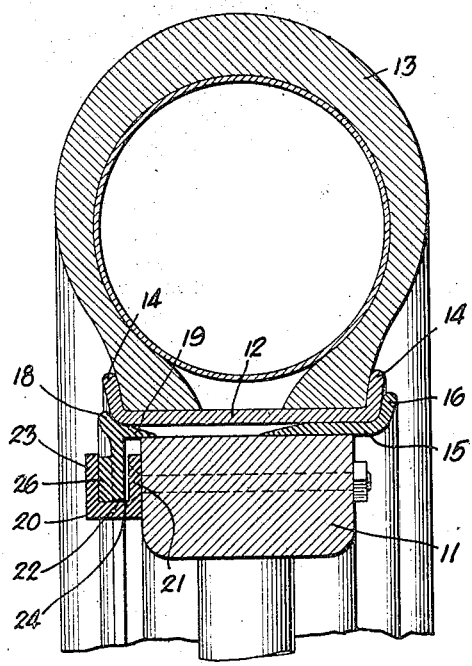
Figure 4 is an enlarged detail sectional view taken on the line 4—4 of Figure 1.
Figure 5:
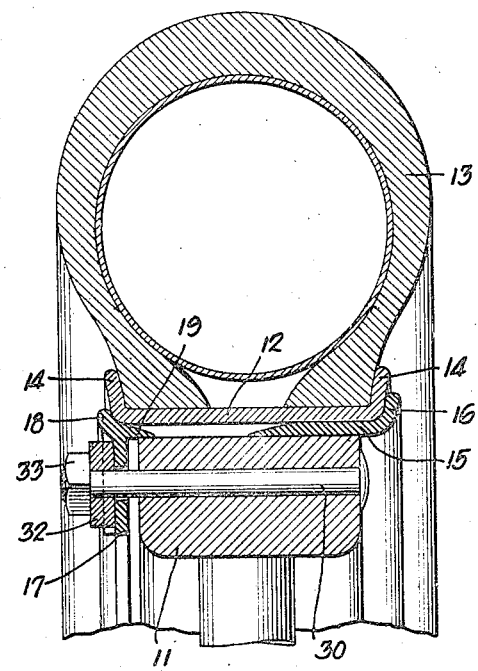
Figure 5 is a similar view taken on the line 5—5 of Figure 1.
Figure 6:
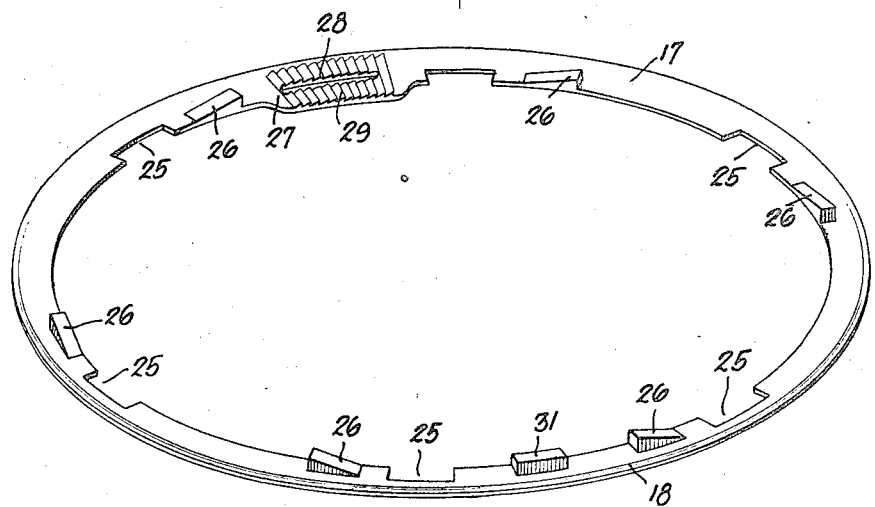
Figure 6 is a perspective view of the locking ring removed from the felly.

Referring to the drawings by characters of reference which denote like parts throughout the several views thereof, 10 designates a conventional form of vehicle wheel which is provided with the usual felly 11 upon which the tire rim 12 is adapted to be mounted and secured. The rim 12 receives the usual tire shoe 13 between its marginal flanges 14.

The present invention as heretofore stated is particularly designed as a means for securing the rim 12 to the felly 11 and the same includes an abutment 15 which is permanently secured to the outer periphery of the felly by any suitable means, said abutment being provided with a marginal flange 16. The abutment and the flange constitute substantially a chair for the reception of one side of the rim in order to support the same and limit a lateral movement in one direction. The means for advancing and retaining the rim in engagement with the abutment 15 and its flange 16 includes an annular locking ring 17 formed at its outer periphery with angularly disposed flanges 18 and 19, the latter being preferably wedge-shaped. A plurality of retaining members 20 are adapted to be secured to that side of the felly, upon which the locking ring is adapted to be arranged and said retaining members include a base 21 having a web 22 projecting laterally therefrom, the free edge of said web being formed with a radially extending flange 23 which overlies the base 21 and is preferably arranged at an angle thereto to provide a wedge-shaped channel 24 therebetween. The inner periphery of the locking ring is provided with a plurality of spaced radial notches 25 corresponding in number and arrangement to the retaining members 20. A wedge-shaped lug 26 is formed adjacent each of the notches 25 on one face of the locking ring, the same being designed to be received by the channel 24 formed by the flange 23 and base 21 of the retaining member in order to co-act therewith for interlocking engagement. The locking ring is provided with an enlarged portion 27 having a circumferential slot 28 formed therein and said enlarged portion is provided with serrations or teeth 29 disposed on the same side of the locking ring as that from which the lugs 26 project. In the application and arrangement of the ring for the purpose of advancing the rim 12 toward the abutment 15 for retaining the same in position on the felly, use is made of a bolt 30 which is passed transversely through the felly and through the slot 28 of the locking ring; the ring is then circumferentially adjusted to register its notches 25 with the flanges 23 of the retaining members; the locking ring is again circumferentially adjusted to cause the wedge-shaped lugs 26 to enter the channel 24 between the flanges 23 and the bases 21 of the retaining members. In order to provide means whereby the wedge-shaped locks may be driven home, a driving lug 31 is provided on that side of the ring from which the lugs 26 project, the same also serving as a means for disengaging the lugs 26 from the channels 24. When the locking ring has been applied and the wedges 26 driven home in the channels 24, the flange 19 will rest upon the outer periphery of the felly and the flange 18 will bear against and support one side of the rim to retain the opposite side thereof against the flange 16 of the abutment 15. The means for securing the locking ring in place and holding the same in its circumferentially adjusted position includes the bolt 30 and the toothed or serrated washer 32, the serrations of which are advanced against the serrations 29 on the enlarged portion 27 by means of the nut 33 threaded on the free extremity of the bolt 30.

From the foregoing, it will be seen that in order to demount the rim from the tire, it is only necessary to remove the nut 33 by disengaging the same from the bolt and striking the lug 31 a light blow sufficient to disengage the wedge faces of the lugs 26 from the flange 23 of the retaining member. A slight circumferential adjustment of the ring will register the notches 25 with the flanges 23 of the retaining members permitting the removal of the locking ring and the demounting of the rim.

While there has been illustrated and described a single and preferred embodiment of the invention, it is understood that no limitation is made to the details of construction but variations and modifications falling within the scope of the appended claims may be resorted to when found desirable.

Having thus described my invention, what I claim as new, and desire to secure by Letters Patent, is,

1. A means for demountably associating a tire rim with the felly of a wheel, comprising a stationary rim seat disposed at one side of the felly and adapted to receive and embrace one side of the rim, a removable rim seat disposed at the opposite side of the felly adapted to receive and embrace the opposite side of the rim, complementary means embodying spaced wedge-shaped channel members on the felly and correspondingly spaced wedge-shaped lugs on said removable rim seat adapted upon circumferential shifting of the same in one direction to advance the latter rim seat toward the former, and means insertable through the felly and engageable with the removable rim seat to retain the same against circumferential shifting movement.

2. A device of the character described for demountably associating a tire rim with the felly of a wheel, comprising a stationary rim seat provided at one side of the felly, a circumferentially shiftable locking ring at the opposite side of the felly constituting a removable rim seat, means on the locking ring embodying spaced wedge-shaped members, complementary means embodying correspondingly spaced wedge-shaped lugs on the felly adapted to coact therewith upon circumferential movement of the locking ring in one direction to effect the advancement of said removable rim seat toward the stationary rim seat, a slotted portion in the locking rim, a securing bolt passing transversely therethrough and through the felly, and interengageable means on said bolt and the locking ring adapted to coact to lock the locking ring in its circumferentially shifted positions and to prevent relative separation of the rim seats.

EARL G. GEHRLICH.